(12) United States Patent
Miyajima et al.

(10) Patent No.: US 8,338,046 B2
(45) Date of Patent: Dec. 25, 2012

(54) FUEL CELL SYSTEM

(75) Inventors: Kazuyoshi Miyajima, Utsunomiya (JP); Takatsugu Koyama, Utsunomiya (JP); Kuniaki Ojima, Rancho Palos Verdes, CA (US)

(73) Assignee: Honda Motor Co., Ltd., Tokyo (JP)

( * ) Notice: Subject to any disclaimer, the term of this patent is extended or adjusted under 35 U.S.C. 154(b) by 15 days.

(21) Appl. No.: 13/300,115

(22) Filed: Nov. 18, 2011

(65) Prior Publication Data

US 2012/0064427 A1 Mar. 15, 2012

Related U.S. Application Data

(63) Continuation of application No. 12/485,136, filed on Jun. 16, 2009, now abandoned.

(30) Foreign Application Priority Data

Jun. 18, 2008 (JP) ................. 2008-159222

(51) Int. Cl.
*H01M 8/04* (2006.01)
(52) U.S. Cl. ...................................... 429/444

(58) Field of Classification Search ............... None
See application file for complete search history.

(56) References Cited

U.S. PATENT DOCUMENTS

2005/0277004 A1  12/2005  Ojima et al.

FOREIGN PATENT DOCUMENTS

| JP | 2006-172935 | 6/2006 |
| JP | 2006-221987 | 8/2006 |
| JP | 2008-130261 | 6/2008 |

OTHER PUBLICATIONS

Japanese Office Action for Application No. 2008-159222, dated Nov. 2, 2010.

*Primary Examiner* — Emily Le
*Assistant Examiner* — Sarah A Slifka
(74) *Attorney, Agent, or Firm* — Nelson Mullins Riley & Scarborough LLP; Anthony A. Laurentano

(57) ABSTRACT

The fuel cell system includes: a fuel cell stack which is supplied with reaction gas, and performs electricity generation; a reaction gas supplier which supplies the reaction gas to the fuel cell stack; a ground fault detector which detects a ground fault from the fuel cell stack; and a reaction gas increasing member which increases an amount of a reaction gas supply to the fuel cell stack, when the ground fault is detected by the ground fault detector.

7 Claims, 9 Drawing Sheets

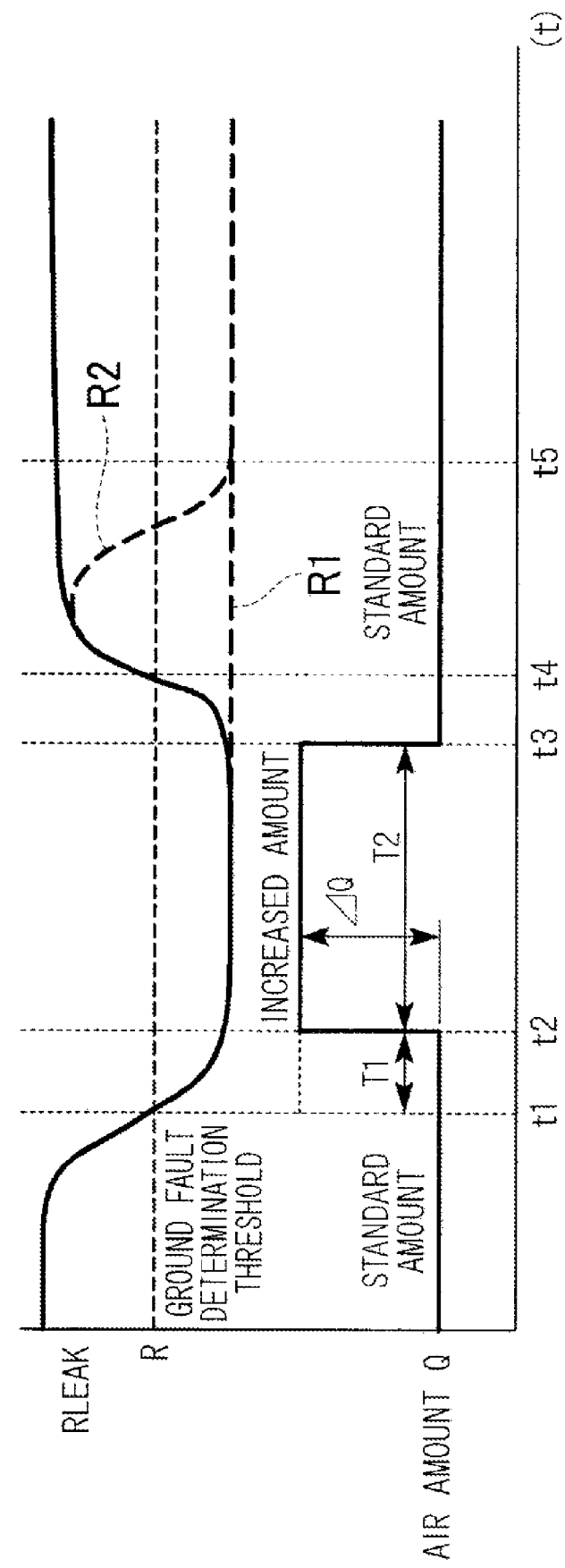

FUEL CELL SYSTEM

RELATED APPLICATIONS

This application is a continuation of U.S. application Ser. No. 12/485,136, filed Jun. 16, 2009, which claims priority to Japanese Patent Application No. 2008-159222, filed Jun. 18, 2008, the contents of which are incorporated herein by reference.

BACKGROUND OF THE INVENTION

1. Field of the Invention

The present invention relates to a fuel cell system.

2. Description of Related Art

There is known a fuel cell having a fuel cell stack formed by stacking a plurality of unit fuel cells (hereinbelow, referred to as "unit cells"). Each of the plate-shaped unit cells is formed by disposing a pair of separators on both sides of a membrane electrode assembly. The membrane electrode assembly is formed by sandwiching a solid polymer electrolyte membrane between an anode and a cathode.

In this fuel cell, hydrogen gas (anode gas) is supplied as fuel gas to a fuel gas passage, which is formed between an anode electrode and an anode-side separator. In addition, the air (cathode gas) is supplied as oxidant gas to an oxidant gas passage, which is formed between a cathode electrode and a cathode-side separator. Accordingly, the hydrogen ion generated at the anode electrode by a catalytic reaction transfers to the cathode electrode, permeating through the solid polymer electrolyte membrane, and electrochemically reacts with oxygen in the air, thereby generating electricity.

The fuel cell is constituted so that the generated electricity is outputted via an electrode provided at the fuel cell, and that no electricity leaks out from elsewhere, preventing a ground fault.

An example of such constitution, as shown in Japanese Unexamined Patent Application, First Publication 2008-130261, includes a contact prevention member which prevents contacts between the fuel cell and an insulating material surrounding the fuel cell, thereby preventing a ground fault between the insulating material and the fuel cell.

In the above-described fuel cell, during the electricity generation, a large amount of generated water is generated in the fuel cell, through the reaction of hydrogen and oxygen. Moreover, in a fuel cell equipped on a fuel cell vehicle, the amount of electricity generation varies along with the variation in the load applied to the fuel cell vehicle. In particular, when a large load is applied to the fuel cell vehicle, the electricity generation amount of the fuel cell becomes larger, and when a small load is applied to the fuel cell vehicle, the electricity generation amount of the fuel cell becomes smaller. In addition, when the fuel cell vehicle is driven at the maximum performance thereof, or the like, in the fuel cell, a high-load electricity generation is performed. On the other hand, in occasions in which the vehicle is reducing the speed, for example, when stopping at a traffic signal, the electricity generation amount of the fuel cell decreases abruptly.

Among those occasions, when the fuel cell vehicle is in the high-load status constitutively, the generated water generated in the fuel cell is blown out along with the gas which is continuously supplied into the fuel cell. However, when the fuel cell vehicle is in the low-load status, and the electricity generation amount of the fuel cell is reduced, the gas amount supplied into the fuel cell also decreases accordingly. As a result, there is a problem in that the generated water which had been ejected along with the reaction gas supplied to the fuel cell accumulates in the gas ejection channel without being ejected.

When the accumulated generated water within the fuel cell bridges the fuel cell and a external attachments of the fuel cell (e.g., a humidifier, a catching tank, or the like), there is a concern that a ground fault occurs in the fuel cell. In the case of such a ground fault in the fuel cell, there is a possibility of electricity troubles such as an excessive electric current passing though the fuel cell, or the like.

The present invention was made in view of the aforementioned circumstances: an object thereof is providing a fuel cell system which can prevent a generated water accumulation in a fuel cell stack, and preventing a ground fault in the fuel cell stack caused by such generated water.

SUMMARY OF THE INVENTION (1) An aspect of the present invention provides the following: a fuel cell system including: a fuel cell stack which is supplied with reaction gas, and performs electricity generation; a reaction gas supplier which supplies the reaction gas to the fuel cell stack; a ground fault detector which detects a ground fault from the fuel cell stack; and a reaction gas increasing member which increases an amount of a reaction gas supply to the fuel cell stack, when the ground fault is detected by the ground fault detector.

(2) The fuel cell system according to aforementioned (1) may further include: a recovery failure status determination member which determines whether the fuel cell stack is in a recovery failure status in which the occurrence of the ground fault is caused by a cause other than an accumulation of generated water, based on a detection result of the ground fault detector, wherein the recovery failure status determination member determines that the fuel cell stack is in the recovery failure status if, after the amount of the reaction gas is increased by the reaction gas increasing member in a predetermined condition, the occurrence of the ground fault is detected by the ground fault detector.

(3) The fuel cell system according to aforementioned (1) may further include: a duration detector which detects a duration of increased reaction gas supply performed by the reaction gas increasing member; and a recovery failure status determination member which determines whether the fuel cell stack is in a recovery failure status, based on a detection result of the ground fault detector, wherein the recovery failure status determination member determines that the fuel cell stack is in the recovery failure status, if the ground fault is detected by the ground fault detector, after the duration detected by the duration detector becomes longer than a predetermined amount of time, and cause the reaction gas increasing member to discontinue the increase of the reaction gas supply.

(4) The fuel cell system according to aforementioned (1) may further include: a reaction gas amount detector which detects an amount of the reaction gas supply after the reaction gas supply is increased by the reaction gas increasing member; and a recovery failure status determination member which determines whether the fuel cell stack is in a recovery failure status, based on a detection result of the ground fault detector, wherein the recovery failure status determination member determines that the fuel cell stack is in the recovery failure status, if, after the amount of the reaction gas supply detected by the reaction gas amount detector exceeds a predetermined amount, the ground fault is detected by the ground fault detector, and cause the reaction gas increasing member to discontinue the increase of the reaction gas supply.

(5) The fuel cell system according to aforementioned (3) or (4) may be constituted as follows: if the ground fault was resolved after the increase of the reaction gas supply by the reaction gas increasing member, the reaction gas increasing member discontinues the increase of the reaction gas supply.

(7) The fuel cell system according to aforementioned (1) may be constituted as follows: if the ground fault is detected by the ground fault detector, an idling reduction is prohibited.

According to the fuel cell system of aforementioned (1), when the amount of the reaction gas supply is increased, the increased reaction gas supply blows out generated water accumulated in the fuel cell stack and ejects the generated water to the outside. Accordingly, even when the fuel cell stack is in a low-load status, and the electricity generation amount and the reaction gas supply is decreased, the generated water accumulated in the fuel cell stack can be removed by the increased amount of the reaction gas.

As a result, an accumulation of generated water in the fuel cell stack caused by the decrease of the electricity generation amount of the fuel cell stack can be prevented. Accordingly, a ground fault of the fuel cell stack caused by the generated water can be prevented. In addition, an electrolytic corrosion and an electricity leak among the cells can be prevented.

When a ground fault is continued to be detected by the ground fault detector after discontinuing the increase of the reaction gas, there is a possibility that the cause of the ground fault is not the accumulation of the generated water, but some other factor, i.e., a short circuit in the electrical wiring, or the like, resulting in the recovery failure status.

The fuel cell system of the aforementioned (2) asserts that the fuel cell stack is in a recovery failure status, when the ground fault detector detects ground fault after discontinuing increased reaction gas supply. Accordingly, the system can determine that the cause of the ground fault is not generated water accumulation, but some other factor. In such cases, the system can take appropriate steps in order to cope with such factor.

According to the fuel cell system of the aforementioned (3), if the ground fault persisted after performing the increased reaction gas supply for a predetermined amount of time, the system determines that the cause of the ground fault is not the accumulation of the generated water, but some other factor. In this case, since further continuation of the increased reaction gas supply is not likely to resolve the ground fault, the system causes the discontinue of the increased reaction gas supply, and thereby prevents excessive drying of the fuel cell stack and an inefficient fuel consumption.

According to the fuel cell system of the aforementioned (4), if the ground fault persisted after the amount of the reaction gas supply exceeded the predetermined amount, the system determines that the cause of the ground fault is not the accumulation of the generated water, but some other factor. In this case, since further continuation of the increased reaction gas supply is not likely to resolve the ground fault, the system causes the discontinue of the increased reaction gas supply, and thereby prevents excessive drying of the fuel cell stack and inefficient fuel consumption.

According to the fuel cell system of the aforementioned (5) or (6), excessive drying of the fuel cell stack and inefficient fuel consumption can be prevented.

According to the fuel cell system of the aforementioned (7), when the ground fault is detected, by prohibiting an idling reduction, the reaction gas can be reliably supplied to the fuel cell stack. Accordingly, the accumulated generated water in the fuel cell stack can be reliably removed.

BRIEF DESCRIPTION OF THE DRAWINGS

FIG. 6 is a time chart showing the transition of the insulation resistance and cathode gas supply amount over time (t), according to the embodiment.

DETAILED DESCRIPTION OF THE INVENTION

One embodiment of the fuel cell system of the present invention will be explained below with reference to the drawings.

(Fuel Cell)

Figure 1:
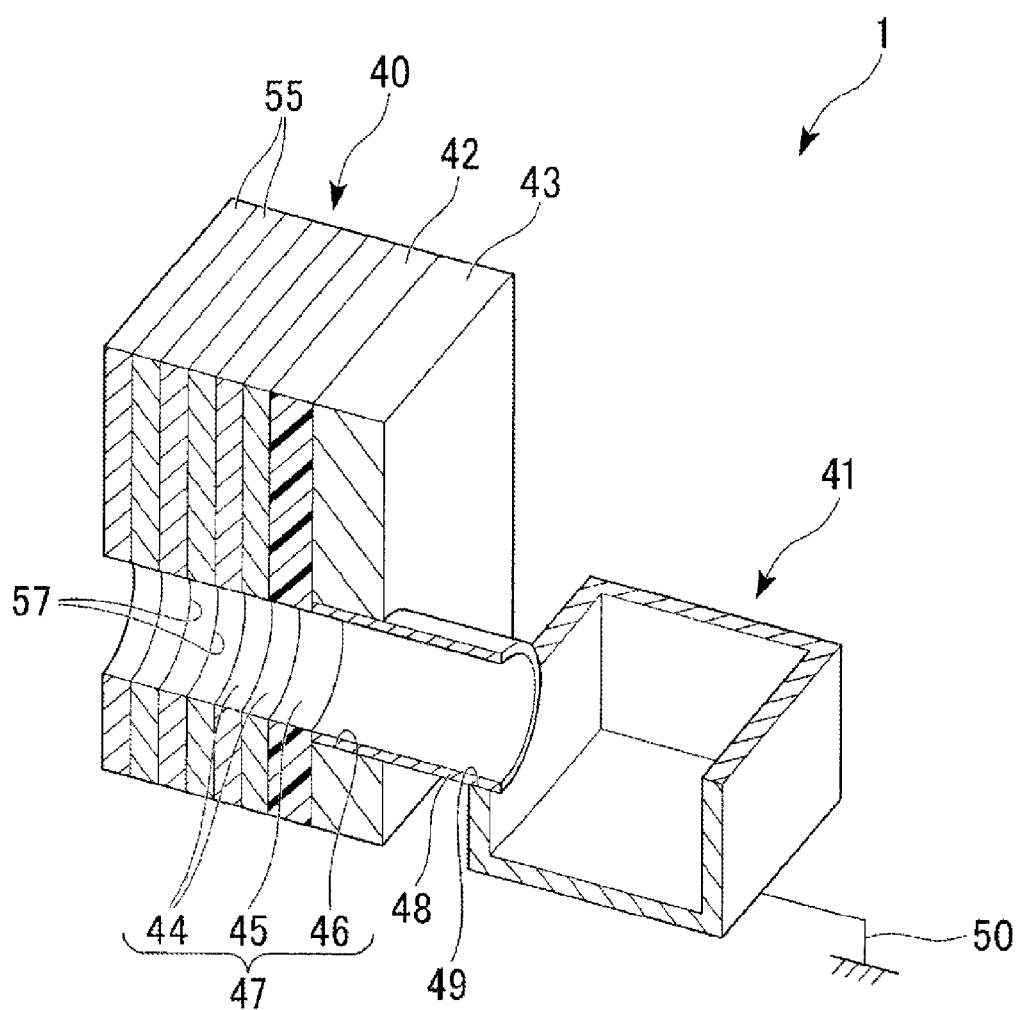
FIG. 1 is a schematic structural view of a fuel cell according to a first embodiment of the present invention.
Figure 2:
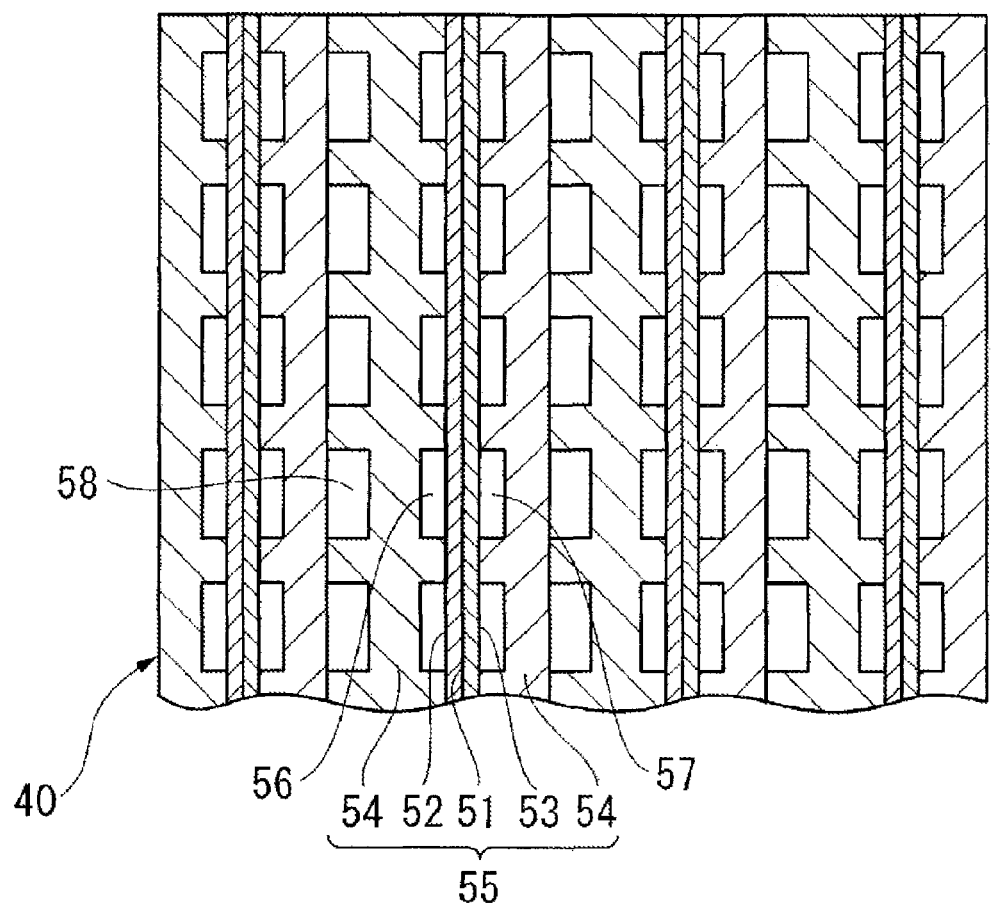
FIG. 2 is a sectional view of a cell of the fuel cell.

FIG. 1 is a schematic structural view of a fuel cell. FIG. 2 is a cross-sectional view of a cell.

As shown in FIG. 1, the fuel cell 1 is provided with a fuel cell stack 40, and a catching tank (an external device of the fuel cell stack) 41 which receives generated water ejected from the fuel cell stack 40.

The fuel cell stack 40 includes a plurality of stacked unit fuel cells (referred to as cell, hereinafter) each formed in a plate shape, electrically connecting those cells in tandem. At the both ends of the stack, a pair of end plates 43 is provided, having an insulator 42 between each of the end plate 43 and the end of the stack. Only one of the end plates 43 is shown in FIG. 1. In other words, the plurality of cells 55 are sandwiched by the end plates 43, with the insulators 42 in between, at the both ends in the stacking direction of the cells 55.

Each of the cells 55 is formed by preparing a solid polymer electrolyte membrane 51 made with, for example, solid polymer ion exchange membrane or the like, e.g., perfluorosulfonic acid polymer (Nafion, a registered trade mark) or the like, and sandwiching the solid polymer electrolyte membrane 51 at the both ends thereof, with an anode 52 and a cathode 53. This complex is further sandwiched at the outside thereof, with a pair of separators 54 to form a cell 55. Each cell 55 has a hydrogen gas passway 56 in which hydrogen gas (anode gas) circulates as fuel gas, and an air pas sway 57 in which air (cathode gas) including oxygen circulates. Hydrogen ion generated by a catalytic reaction at the anode 52 permeates through the solid polymer electrolyte membrane 51 and transfers to the cathode 53, where the hydrogen ion electrochemically reacts with the oxygen, and thereby generates electricity.

In order to prevent temperature rise of the fuel cell 1 exceeding a predetermined temperature caused by heat generation accompanied with aforementioned electricity generation, coolant liquid circulating in coolant pas sways 58 is constituted to transfer the heat so as to cool the fuel cell 1.

As shown in FIG. 1, at each of the cells 55, a cathode off-gas ejection opening 44 is provided, which communicates the cell 55 in the thickness direction (stacking direction). This cathode off-gas ejection opening 44 circulates cathode off-gas which is used in the electricity generation in the fuel cell stack 40, and generated water which is generated by the reaction in the fuel cell stack 40, and ejects them out of the fuel cell 1.

Each of the insulators 42 and end plates 43 stacked with the cells 55 are also provided with cathode off-gas ejection openings 45, 46 penetrating the insulators 42 and the end plates 43, so as to be positioned coincided with the cathode off-gas ejection opening 44 of the cells 55 along the planer direction.

The cathode off-gas ejection openings 44, 45, 46 of the cells 55, the insulators 42, and the end plates 43 are connected to each other, constituting a cathode off-gas ejection opening 47. The cathode off-gas ejection opening 47 communicates in the stacking direction of the cells 55 of the fuel cell stack 40. The cathode off-gas ejection opening 46 of the end plates 43 is positioned so as to open toward the exterior of the fuel cell stack 40.

A catching tank 41 is provided at a downstream side of the cathode off-gas ejection opening 47, i.e., at the side opposite of the cells 55, with the end plates 43 positioned in between the cells 55 and the catching tank 41. The catching tank 41 has a box shape. The catching tank 41 is constituted so that, when a predetermined amount of the generated water is accumulated in the catching tank 41, the generated water is ejected to the exterior. Between the catching tank 41 and the fuel cell stack 40, an intermediate joint 48 is connected, which communicates the catching tank 41 and the cathode off-gas ejection opening 47 of the fuel cell stack 40. This intermediate joint 48 has a tubular shape, having an end thereof connected with an inside of the opening of the cathode off-gas ejection opening 47 (the cathode off-gas ejection opening 46 of the end plate 43), and having the other end thereof connected with the supply opening 49 of the catching tank 41. Accordingly, the cathode off-gas and the generated water circulating from the fuel cell stack 40 through the cathode off-gas ejection opening 47 are ejected through the intermediate joint 48 and the catching tank 41, to the exterior of the fuel cell 1.

The catching tank 41 is connected with the ground 50, providing an earthing circuit. A hydrogen gas ejection opening (not shown in the drawing) is also formed in the fuel cell stack 40 which ejects anode off-gas after the reaction in the fuel cell stack 40, and also ejects generated water intruded into the anode 52 side, functioning in a similar manner with the cathode off-gas ejection opening 47 which ejects the air and the generated water.

(Fuel Cell System)

Figure 3:
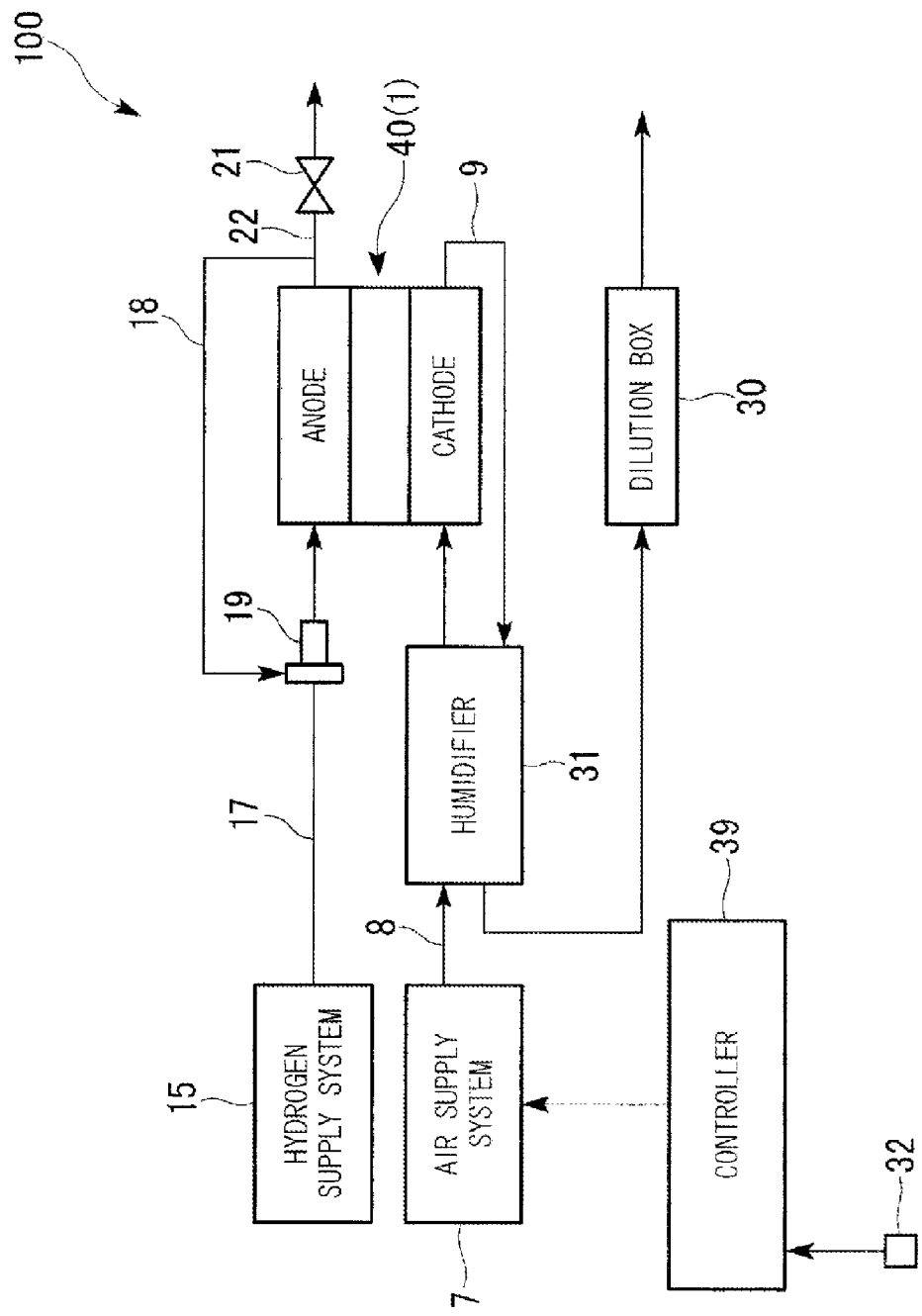
FIG. 3 is a schematic structural view of a fuel cell system according to the embodiment.

The fuel cell system of the present embodiment is explained below. FIG. 3 is a schematic structural view of the fuel cell system.

As shown in FIG. 3, the fuel cell 1 in this fuel cell system 100 is equipped to a fuel cell vehicle (not shown). The fuel cell 1 is constituted with the aforementioned fuel cell stacks 40. In FIG. 3, the catching tank 41 is omitted.

The fuel cell system 100 is provided with a hydrogen supply system 15 in which hydrogen gas as anode gas is stored, and which supplies the anode gas for the fuel cell 1. This hydrogen supply system 15 is connected with the entrance of the fuel cell 1 through an anode gas supply passway 17. In the anode gas supply passway 17, between the hydrogen supply system 15 and the fuel cell 1, a pressure-reducing valve (not shown) and an ejector 19 are provided. The pressure-reducing valve reduces the pressure of the anode gas to a predetermined pressure. The ejector 19 cause the anode off-gas to join the anode gas supply passway 17.

At the anode gas ejection (exit) side of the fuel cell 1, an anode off-gas circulation passway 18 is connected. Unreacted anode gas which was left without being consumed by the reaction is vacuumed by the ejector 19 though the anode off-gas circulation passway 18, and supplied again to the anode gas supply passway 17 of the fuel cell 1.

From the anode off-gas circulation passway 18, an anode off-gas ejection channel 22 branches off, which is provided with a hydrogen ejection valve 21. The hydrogen ejection valve 21 opens and ejects anode off-gas, when an impurity (water, nitrogen, and the like) in the anode gas circulating in the fuel cell 1 occupied a large concentration, or else, whenever if necessary.

The fuel cell system 100 is provided with an air supply system 7 (reaction gas supplier and reaction gas increasing member) which is constituted with a super-charger, and which pressurize the air as cathode gas to a predetermined pressure. To this air supply system 7, a cathode gas supply passway 8 which supplies the cathode gas from the air supply system 7 to the fuel cell 1. This cathode gas supply passway 8 is connected to the entrance of the fuel cell 1, from the air supply system 7 and through a humidifier 31.

At an exit of the fuel cell 1, a cathode off-gas ejection channel 9 is connected. The cathode off-gas ejection channel 9 is connected with a dilution box 30, through the humidifier 31.

To the above-described humidifier 31, the cathode gas supply passway 8 and the cathode off-gas ejection channel 9 are connected. The humidifier 31 use the cathode off-gas which is ejected from the fuel cell 1 after the reaction in the fuel cell 1, as humidifying gas. Accordingly, the humidifier 31 humidifies the air (cathode gas) used in the reaction of the fuel cell 1. The cathode off-gas circulated in the humidifier 31 is supplied to the dilution box 30 via the cathode off-gas ejection channel 9.

The fuel cell system 100 is provided with a ground fault sensor (ground fault detector) 32 which detects a ground fault of the fuel cell 1. This ground fault sensor 32 is constitutively monitoring the insulation resistance (RLEAK) between the aforementioned ground 50 and the fuel cell 1. The ground fault sensor 32 sends the monitoring results as a resistance detection signal, to a controller 39 (described below).

The fuel cell system 100 is provided with a controller 39, which controls the overall fuel cell system 100. For example, the controller 39 stores a threshold value of insulation resistance used in determining whether there is a significant possibility of a ground fault of fuel cell 1 (hereinafter, this threshold value is referred to as ground fault determination threshold R). The controller 39 compares this ground fault determination threshold R and a resistance detection signal outputted from the ground fault sensor 32. In this manner, whether the fuel cell 1 is causing a ground fault can be detected. When a ground fault of fuel cell 1 is detected, the controller 39 sends an air amount control signal to the air supply system 7, in order to control the cathode gas amount supplied from the air supply system 7 to the fuel cell 1.

The controller 39 is provided with a recovery failure status determination member, which determines that the system is in a recovery failure status in which a ground fault is caused by a factor other than an accumulation of generated water, when a ground fault is detected after a discontinuation of an increased supply of the cathode gas by the air supply system 7.

(Ground Fault Detection Method)

Figure 4:
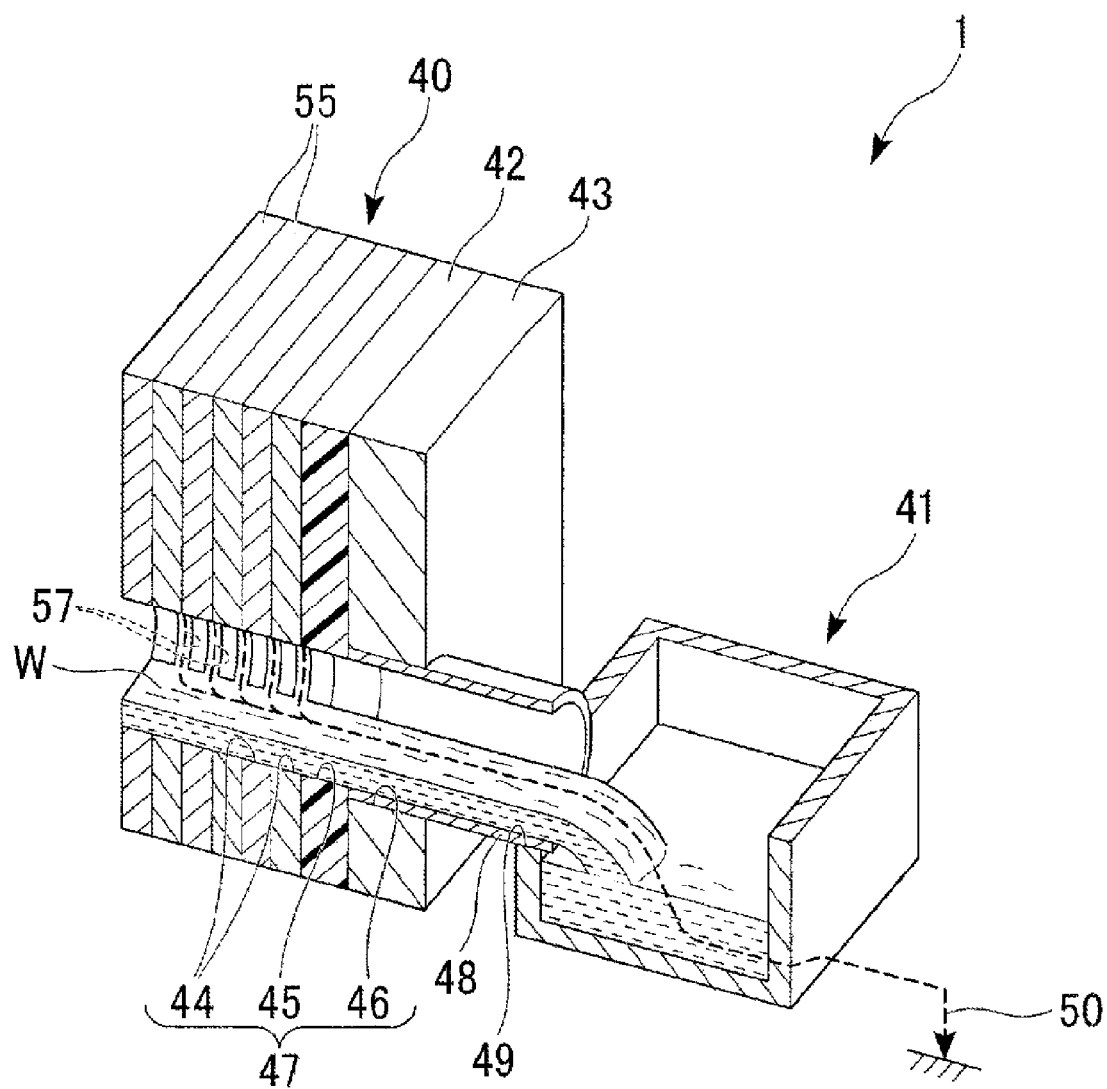
FIG. 4 is a schematic structural view of the fuel cell when a ground fault has occurred.

A ground fault detection method according to the present embodiment is described below. First, factors causing ground faults of fuel cell is described. FIG. 4 is a schematic structural view of the fuel when a ground fault has occurred.

As shown in FIG. 4, when electricity generation is performed in the fuel cell 1, the reaction of anode gas and the cathode gas results in a large amount of generated water W in the fuel cell 1. The generated water W, along with the cathode off-gas, passes through the air passway 57 of each cell 55, and ejected to the cathode off-gas ejection opening 47. The generated water W ejected to the cathode off-gas ejection opening 47 passes through the inside of the intermediate joint 48 and ejected into the catching tank 41. When a predetermined amount of the generated water W is accumulated in the catching tank 41, the generated water W is then ejected out of the fuel cell 1.

When the fuel cell vehicle is in a high-load status, the generated water W generated in the fuel cell 1 is blown away toward the catching tank 41 and ejected, along with the cathode off-gas, which is continuously ejected from the inside of the fuel cell 1 to the cathode off-gas ejection opening 47. On the other hand, when the fuel cell vehicle is in a low-load status (i.e., when the electricity generation amount is decreased), accompanied with this decrease in the electricity generation amount, the supply amount of the cathode gas becomes also decreased. Accordingly, the ejection amount of the cathode off-gas through the cathode off-gas ejection opening 47 becomes also decreased. As a result, the generated water W which had been ejected along with the cathode off-gas supplied to the fuel cell 1, remains without ejected and accumulates in the cathode off-gas ejection opening 47 and the intermediate joint 48, or the like.

In such an occasion, the generated water W accumulated in the cathode off-gas ejection opening 47 and the intermediate joint 48 may bridge the fuel cell stack 40 and the catching tank 41 provided at an outside of the fuel cell stack 40. This bridging results in a decrease of the insulation resistance between the ground 50 and the fuel cell 1, as depicted by the broken line in FIG. 4. As a result, a ground fault of the fuel cell 1 occurs. In the case of such a ground fault of the fuel cell 1, there is a concern of electricity troubles such as an excessive electric current passing through the fuel cell, or the like. Moreover, if the generated water W is accumulated in the cathode off-gas ejection opening 47, there is a concern of electrolytic corrosion and an electricity leak among the cells 55.

Figure 5:
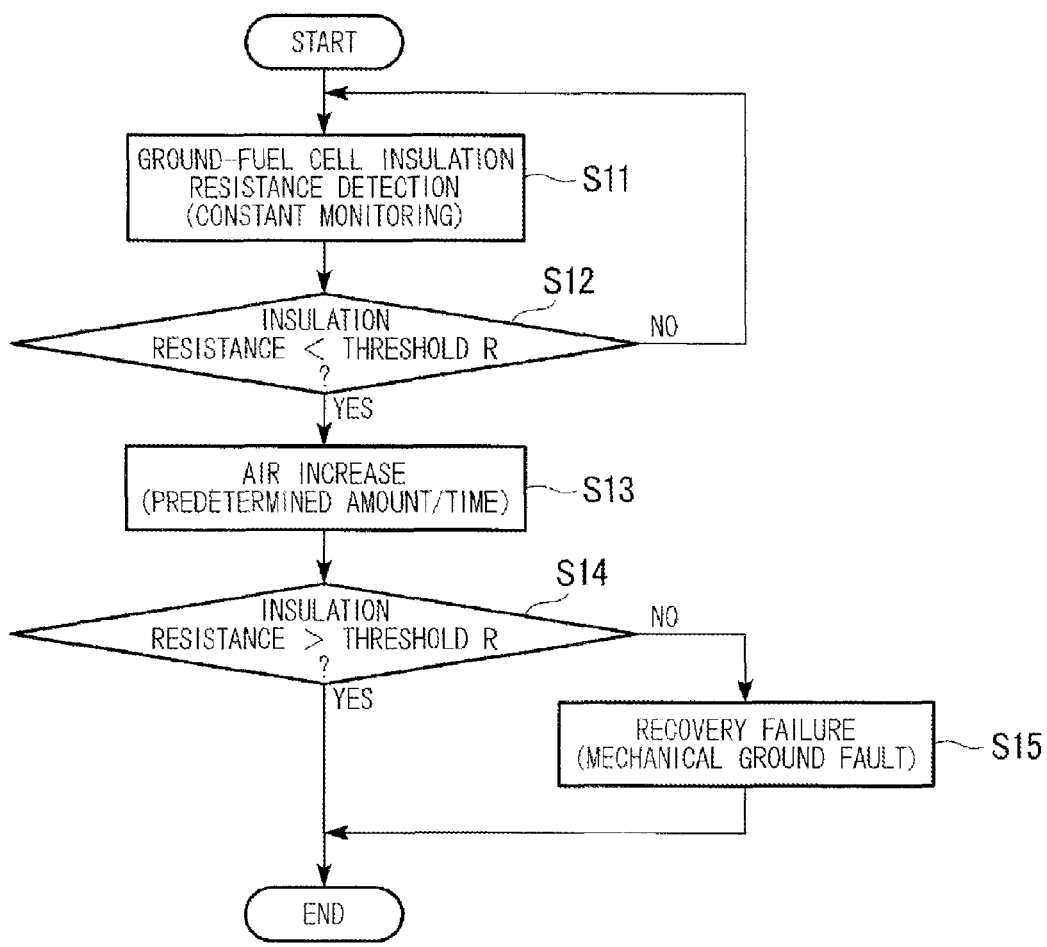
FIG. 5 is a flowchart showing a ground fault detection method according to the embodiment of the present invention.

FIG. 5 is a flowchart showing a ground fault detection method. FIG. 6 is a time chart showing the transition of the insulation resistance and cathode gas supply amount over time (t).

Firstly, as shown in FIGS. 5 and 6, in process S11, the insulation resistance between the ground 50 (vehicle body) and the fuel cell 1 (high-voltage part) is monitored continuously, by the ground fault sensor 32. The ground fault sensor 32 sends the monitoring result to the controller 39, as a resistance detection signal.

In the next process S12, the controller 39 compares the resistance detection signal sent by the ground fault sensor 32 and the ground fault determination threshold R stored in the controller 39. Thereby, the controller 39 determines whether the insulation resistance between the ground 50 and the fuel cell 1 is lower than the ground fault determination threshold R (insulation resistance<determination threshold R).

If the determination result in process S12 is NO, namely, if the insulation resistance between the ground 50 and the fuel cell 1 is equal to or higher than the ground fault determination threshold R, it is assumed that ground fault of the fuel cell 1 is not occurring. In this case, the procedure returns to process S11, and continues the insulation resistance monitoring by the ground fault sensor 32.

On the other hand, if the determination result of process S12 is YES, namely, if the insulation resistance between the ground 50 and the fuel cell 1 was lower than the ground fault determination threshold R (after time t1 in FIG. 6), the controller 39 determines that a ground fault of the fuel cell 1 occurred. In this case, the controller 39 sends an air amount control signal to the air supply system 7. The procedure then proceeds to process S13.

In process S13, upon receiving the air amount control signal sent from the controller 39, the air supply system 7 increase the cathode gas amount (air amount Q in FIG. 6) supplied to the cathode 53 side of the fuel cell 1. Specifically, as shown in FIG. 6, at a time point t2, when a predetermined time T1 has past after the insulation resistance became lower than the ground fault determination threshold R, the supply amount of the cathode gas is increased by a predetermined amount ΔQ from the standard amount Q. This state of increased cathode gas supply by the predetermined amount ΔQ is maintained for a predetermined time T2. After the predetermined time T2 has past, at a time point t3, the increased cathode gas supply is discontinued, and the supply amount of the cathode gas is brought back to the standard amount Q. Here, the increasing amount of the cathode gas supply, the predetermined amount ΔQ, and the sustention time of the increased cathode gas supply, the predetermined time T2, are each set to be sufficient values in order for the insulation resistance to recover. When the increased cathode gas supply is discontinued, the procedure proceeds to process S14.

Figure 7A:
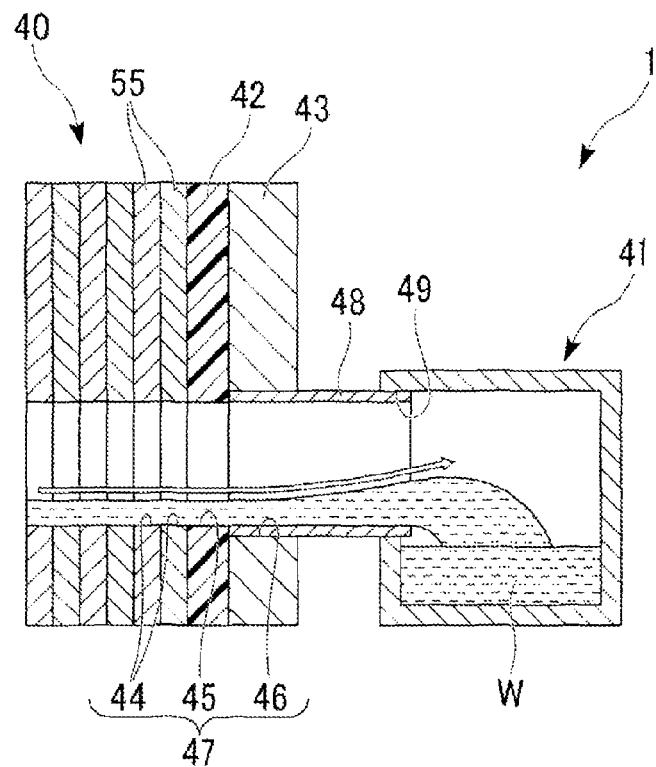
FIGS. 7A and 7B are enlarged views of a relevant part, showing the flow of generated water in the fuel cell.
Figure 7B:
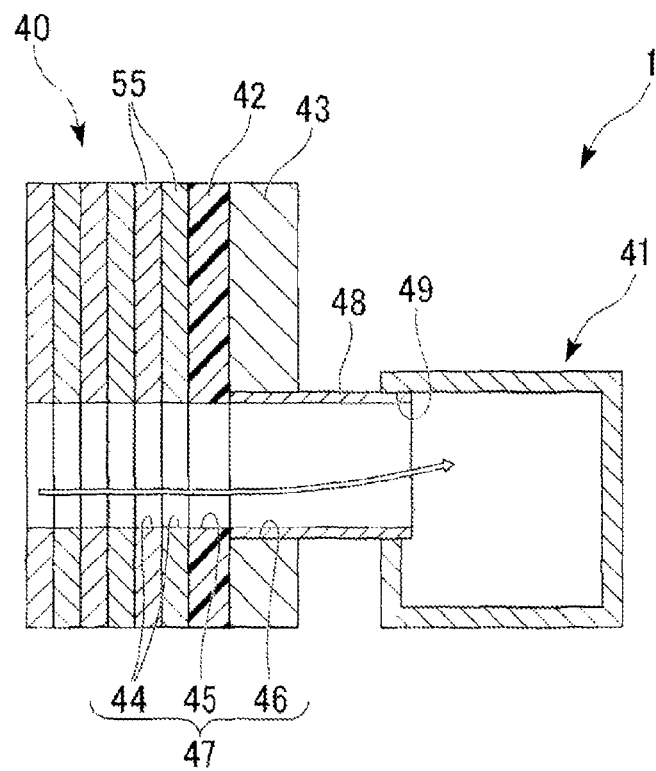

FIGS. 7A and 7B are enlarged views of a relevant part in FIG. 1, depicting the flow of the generated water in the fuel cell, during the aforementioned process S13.

When the cathode gas supply from the air supply system 7 is increased, firstly, as shown in FIG. 3, the increased cathode gas circulates in the cathode gas supply passway 8, flows through the humidifier 31, and is supplied into the fuel cell stack 40. The cathode gas circulated in the fuel cell stack 40 is converted to the cathode off-gas, and ejected via the air passway 57 to the cathode off-gas ejection opening 47.

As shown in FIG. 7A, the cathode off-gas ejected into the cathode off-gas ejection opening 47 (represented by an arrow in FIG. 7A) flows through the cathode off-gas ejection opening 47 toward the catching tank 41. At this time, the cathode off-gas blows off the generated water W accumulated in the intermediate joint 48, out of the cathode off-gas ejection opening 47, toward the downstream side (toward the catching tank 41). The generated water W blown off by the cathode off-gas flows into the catching tank 41, and thereby, is ejected out of the fuel cell 1. Accordingly, as shown in FIG. 7B, the generated water W accumulated from the cathode off-gas ejection opening 47 into the intermediate joint 48 is removed. As a result, as shown in FIG. 6, during the period between time points t3 and t4, the insulation resistance gradually recovers.

In cases wherein the cause of the ground fault of the fuel cell 1 is the accumulation of the generated water W, by performing the aforementioned process S13, in which the cathode gas is increased, the generated water W can be removed, resulting in an increased insulation resistance between the ground 50 and the fuel cell 1, and thereby the ground fault can be recovered. However, in cases wherein the cause of the ground fault is not the accumulation of the generated water W, namely, when the cause is, for example, a short circuit in the electrical wiring or the like, even after the removal of the generated water W, the insulation resistance would not recover, and the status of the ground fault remains, as represented by the broken line R1 in FIG. 6. Such status, wherein a ground fault is caused by a factor other than an accumulation of the generated water W, is referred to as recovery failure status (ground fault recovery failure), hereinafter.

As shown in FIGS. 5 and 6, in process S14, the controller 39 determines whether the insulation resistance between the ground 50 and the fuel cell 1 is higher than the ground fault determination threshold R (time point t5 in FIG. 6; insulation resistance>threshold R). The ground fault determination threshold R in this process can be the same value used in process S12. Alternatively, the threshold R in process S13 can be set higher than the threshold R in process S12. In this case, the system can be more reliably controlled.

If the determination result of process S14 is NO, namely, if the insulation resistance is equal to or lower than the ground fault determination threshold R, it is assumed that even after the generated water W is removed, the ground fault did not recover. In this case, the recovery failure status determination member determines that the fuel cell 1 is in a recovery failure status, and the procedure proceeds to process S15.

In process S15, a possibility of mechanical ground failure may be investigated, and/or an alarm may be given to the operator. The system may further perform countermeasures to such mechanical ground failure, e.g., generation/output regulations.

On the other hand, if the determination result in process S14 is YES, namely, if the insulation resistance is higher than the ground fault determination threshold R, it is assumed that by removing the generated water W, the insulation resistance was recovered, and the procedure ends. In a case wherein the insulation resistance was once recovered and then become lower again, as represented by R2 in FIG. 6, the entire of the aforementioned procedure is repeated.

The system according to the present embodiment is constituted so that, when a ground fault is detected by the ground fault sensor 32, the cathode gas supplied from the air supply system 7 is increased.

According to this constitution, when a ground fault of fuel cell 1 is detected by the ground fault sensor 32, by causing the air supply system 7 to increase the cathode gas supply to the fuel cell stack 40, the generated water W accumulated in the fuel cell 1 is blown away and ejected by the increased cathode gas. Namely, even when the fuel cell 1 is in a low-load status, and the electricity generation amount is decreased, by increasing the cathode gas, the generated water accumulated in the fuel cell 1 can be removed.

As a result, an accumulation of generated water W in the fuel cell 1 caused by an electricity generation amount decrease can be prevented, and thereby a ground fault of the fuel cell 1 by the generated water W can be prevented. Moreover, an electrolytic corrosion between cells 55 and an electricity leak in the cathode off-gas ejection opening 47 caused by the generated water W accumulation can be prevented.

The system determines that the fuel cell stack 40 is in a recovery failure status, if the ground fault sensor 32 still detected a ground fault after discontinuing the cathode gas increase. Thereby, the system can assume that the cause of the ground fault is not the generated water W accumulation, but some other factor. Moreover, the system increase the cathode gas supply for the predetermined time T2 by the predetermined amount ΔQ, and then discontinue the increased cathode gas supply. Thereby, an excessive drying of the fuel cell stack 40 and an inefficient fuel consumption can be prevented.

Second Embodiment

Ground Fault Detection Method

Figure 8:
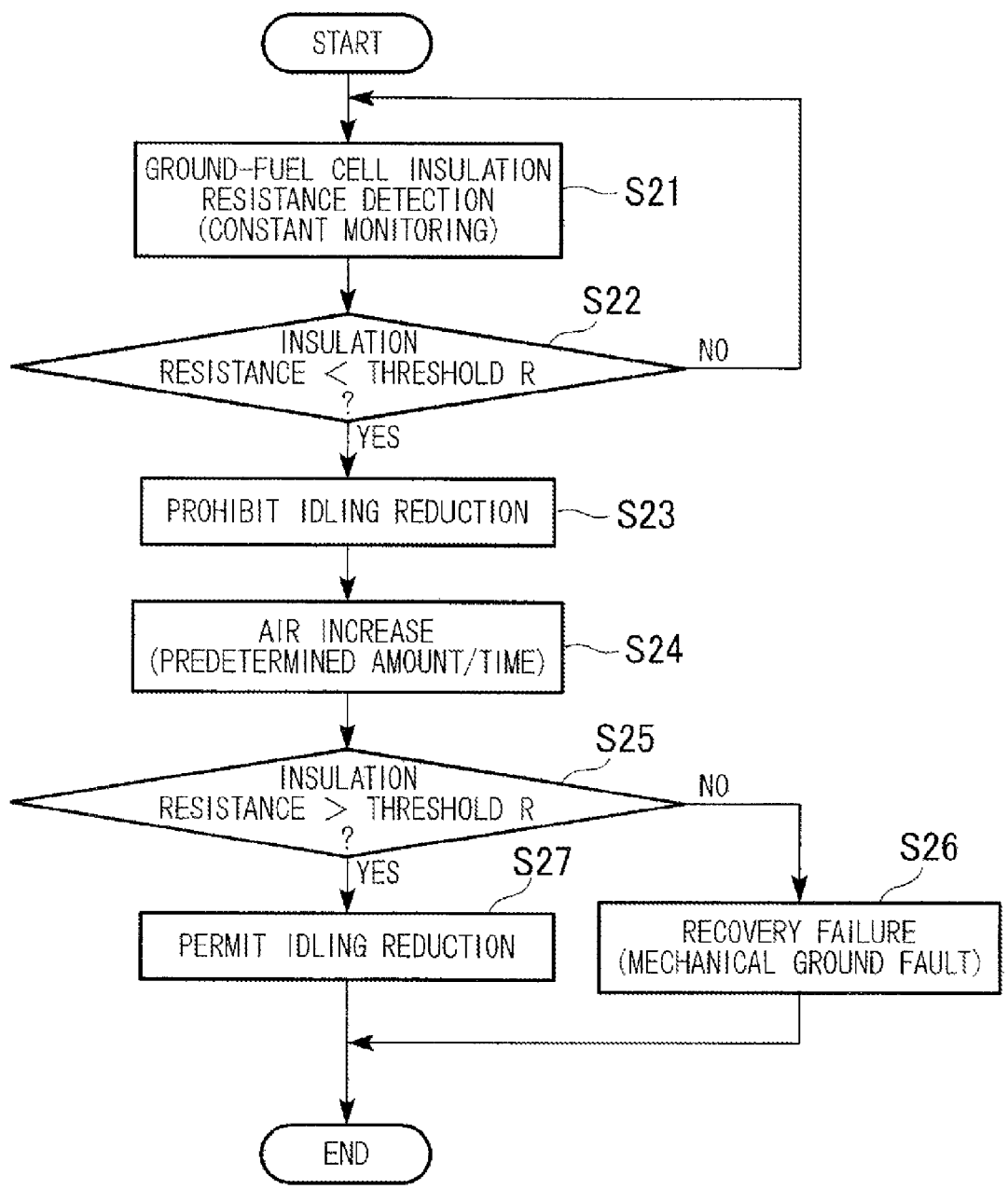
FIG. 8 is a flowchart showing a detection method of ground fault according to a second embodiment.

A ground fault detection method according to a second embodiment will be explained below. FIG. 8 is a flowchart showing the ground fault detection method. In the present embodiment, when a ground fault is detected, the system prohibits performing an idling reduction. In the below description, FIG. 6 of the first embodiment will be referred to. Explanations of the procedures similar to the aforementioned first embodiment will be omitted.

As shown in FIG. 8, following a similar procedure as in the first embodiment, in process S21, the ground fault sensor 32 continuously monitors the insulation resistance between the ground 50 and the fuel cell 1. In process S22, whether the insulation resistance between the ground 50 and the fuel cell 1 is lower than the ground fault determination threshold R is determined (insulation resistance<determination threshold R).

If the determination result of process S22 is NO, namely, if the insulation resistance is higher than the ground fault determination threshold R, the procedure determines that the ground fault of fuel cell 1 is not occurring. The procedure then returns to process S21, and the insulation resistance monitoring by the ground fault sensor 32 is carried on.

On the other hand, if the determination result of process S22 is YES, namely, if the insulation resistance is lower than the ground fault determination threshold R, (after time point t1 in FIG. 6), the procedure determines that the ground fault of the fuel cell 1 is occurring. The procedure then sends an air amount control signal to the air supply system 7. The procedure then proceeds to process S23.

In process S23, the procedure causes the controller 39 to prohibit an idling reduction of the fuel cell vehicle. When the vehicle is in a stop, if an idling reduction (electricity generation halt) is performed by the fuel cell 1, then fuel cell system 100 (as shown in FIG. 3) halts, resulting in a halt of the air supply system 7. Accordingly, by prohibiting an idling reduction, the procedure maintains the air supply system 7 from stopping.

Next, in process S24, following a similar procedure as in process S13 of the first embodiment, the cathode gas supplied to the fuel cell 1 is increased, thereby removing accumulated generated water W in the fuel cell 1 (FIG. 7).

In process S25, following a similar procedure as in the first embodiment, the procedure determines whether the insulation resistance is higher than the ground fault determination threshold R (insulation resistance>threshold R).

If the determination result of process S25 is NO, namely, if the insulation resistance is lower than the ground fault determination threshold R, the procedure recognizes that the ground fault is not resolved, even after the removal of the generated water W. Accordingly, the recovery failure status determination member assumes that the fuel cell 1 is in a recovery failure status. The procedure then proceeds to process S26.

On the other hand, if the determination result of process S25 is YES, namely, if the insulation resistance is higher than the ground fault determination threshold R, the procedure assumes that the insulation resistance is recovered by removing the generated water W. The procedure then proceeds to process S27.

In process S27, the controller 39 permits an idling reduction. The procedure then ends.

In the system of the second embodiment, the functions and effects of the first embodiment are maintained. In addition, if the system determined that there is a possibility of a ground fault, the system causes the controller 39 to prohibit an idling reduction of the fuel cell vehicle. Thereby, the cathode gas can be reliably supplied, which leads to a reliable removal of the accumulated generated water W.

Third Embodiment

A third embodiment of the present invention is described below.

The present embodiment differs from the aforementioned embodiments in that in the present embodiment, the system includes a duration detector, which detects the time elapsed after the cathode gas is increased. Furthermore, in the present embodiment, after the duration detector detected that a predetermined time has elapsed, if the ground fault sensor 32 still detects a ground fault, the recovery failure status determination member determines that the system is in a recovery failure status.

(Ground Fault Detection Method)

Figure 9:
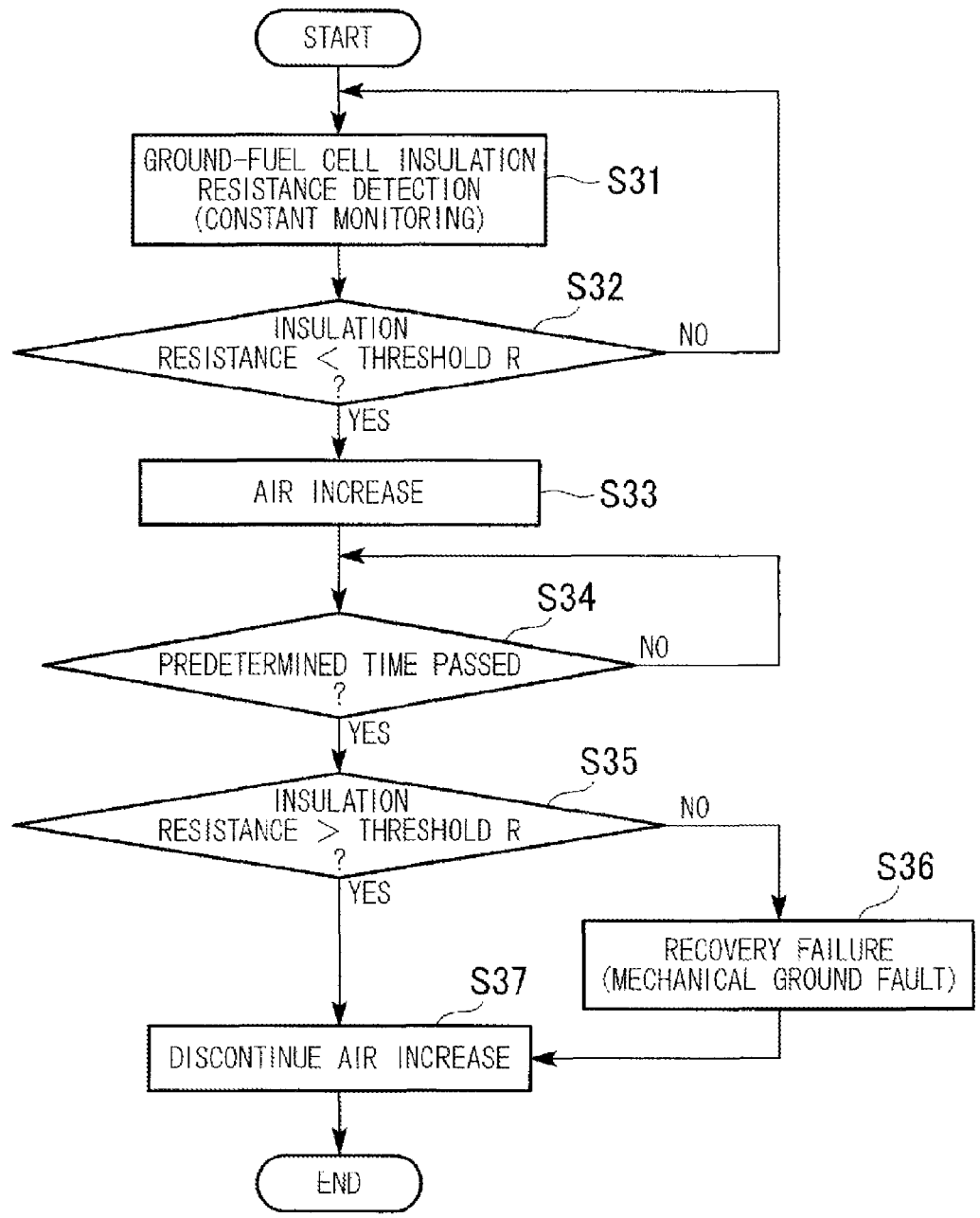
FIG. 9 is a flowchart showing a detection method of ground fault according to a third embodiment.

FIG. 9 is a flowchart showing a detection method of ground fault according to a third embodiment.

In the following description, procedures performed in a similar manner as in the aforementioned first embodiment will be omitted from the explanation.

As show in FIG. 9, the processes S31 to S33 are performed in a similar manner as in the processes S11 to S13 of the aforementioned first embodiment.

In process S34, the duration detector of the controller 39 determines whether a predetermined supply time has elapsed after the cathode gas is increased.

If the determination result in process S34 is NO, namely, if the duration of the increased cathode gas supply has not exceeded the predetermined amount of time, the procedure returns to process S33, and continues increased cathode gas supply.

On the other hand, if the determination result in process S34 is YES, namely, if the duration of the increased cathode gas supply exceeded the predetermined amount of time, the procedure proceeds to process S35.

In process S35, in a similar matter as in the aforementioned process S14, the controller 39 determines whether the insulation resistance between the ground 50 and the fuel cell 1 is higher than the ground fault determination threshold R (insulation resistance>threshold R).

If the determination result of process S35 is NO, namely, if the insulation resistance is lower than the ground fault determination threshold R, the process asserts that the ground fault was not resolved even after the generated water W removal. Accordingly, the recovery failure status determination member determines that the fuel cell 1 is in a recovery failure status. The procedure then proceeds to process S36.

On the other hand, if the determination result of the process S35 is YES, namely, if the insulation resistance is higher than the ground fault determination threshold R, then the process asserts that the insulation resistance was recovered by the generated water W removal. The process then proceeds to process S37.

In process S37, the controller 39 sends an air amount control signal to the air supply system 7. The air supply system 7 receives the air amount control signal and discontinues the cathode gas increase, thereby bringing back the cathode gas supply amount to the standard amount Q (FIG. 6).

Thereafter, the procedure of the present embodiment ends.

In the system of the present embodiment, the functions and effects of the first embodiment are maintained. In addition, after the procedure determined that the insulation resistance is recovered, the procedure discontinues the increase of the cathode gas. Accordingly, the generated water W accumulated in the fuel cell 1 can be further reliably removed.

Moreover, if the ground fault has not resolved after the predetermined amount of cathode gas increase, the procedure asserts that the ground fault is not caused by the accumulation of the generated water W (FIG. 7), but by some other factor. The recovery failure status determination member then determines that the fuel cell stack 40 is in a recovery failure status. In this case, the ground fault is not likely to be resolved, even if the cathode gas increase is further continued. By discontinuing such cathode gas increase, an excessive drying of the fuel cell stack 40 and an inefficient fuel consumption can be prevented.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

For example, in the aforementioned third embodiment, the constitution included a duration detector which detects the duration of increased cathode gas supply. Alternatively, a gas amount detector may be included, which detects the amount of gas supplied in the increased gas supply. In this case, when a predetermined amount of gas is supplied after the cathode gas supply rate is increased, the system asserts whether the insulation resistance is higher than the ground fault determination threshold. Thereafter, the increased supply of the cathode gas is discontinued, and a regular supply rate is resumed. Thereby, the similar function and effect can be obtained as in the aforementioned third embodiment.

What is claimed is:

1. A method for determining that a fuel cell stack is in a recovery failure status, the method comprising:
    defining the recovery failure status as a failure status that occurs when a ground fault in the fuel cell stack is caused by a reason other than an accumulation of generated water, wherein the recovery failure status is irrecoverable by increasing an amount of a reaction gas supplied to the fuel cell stack,
    supplying the reaction gas to the fuel cell stack, wherein the fuel cell stack generates electricity and water;
    detecting the ground fault between the fuel cell stack and the ground;
    increasing the amount of the reaction gas supplied to the fuel cell stack;
    re-detecting, after increasing the amount of the reaction gas supplied to the fuel cell stack, the ground fault between the fuel cell stack and the ground; and
    determining, after re-detecting the ground fault, that the fuel cell stack is in the recovery failure status.

2. The method of claim 1, wherein an insulation resistance between the ground and the fuel cell stack is lower than a ground fault determination threshold.

3. The method of claim 1, further comprising:
    detecting a duration of increased reaction gas supply;
    determining that the fuel cell stack is in the recovery failure status if the ground fault continues even after the detected duration becomes longer than a predetermined amount of time; and
    discontinuing the increased reaction gas supply.

4. The method of claim 3, further comprising:
    discontinuing the increased reaction gas supply if the ground fault was resolved after the amount of the reaction gas supply is increased.

5. The method of claim 1, further comprising:
    detecting an amount of the reaction gas supply after the reaction gas supply is increased;
    determining that the fuel cell stack is in the recovery failure status if the ground fault continues even after the detected amount of the reaction gas supply exceeds a predetermined amount; and
    discontinuing the increased reaction gas supply.

6. The method of claim 5, further comprising:
    discontinuing the increased reaction gas supply if the ground fault was resolved after the amount of the reaction gas supply is increased.

7. The method of claim 1, wherein the fuel cell stack is equipped on a vehicle, the method further comprising:
    prohibiting an idling reduction of the vehicle if the ground fault is detected.

* * * * *